(12) United States Patent
Jain

(10) Patent No.: US 9,747,359 B2
(45) Date of Patent: Aug. 29, 2017

(54) USING A DATABASE TO TRANSLATE A NATURAL KEY TO A SURROGATE KEY

(75) Inventor: Rohit N Jain, Austin, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 664 days.

(21) Appl. No.: 13/276,803

(22) Filed: Oct. 19, 2011

(65) Prior Publication Data

US 2013/0103691 A1  Apr. 25, 2013

(51) Int. Cl.
*G06F 17/30* (2006.01)

(52) U.S. Cl.
CPC .............. *G06F 17/30595* (2013.01)

(58) Field of Classification Search
CPC ................................. G06F 17/30595
USPC .................................. 707/741, 602
See application file for complete search history.

(56) References Cited

U.S. PATENT DOCUMENTS

| | | | |
|---|---|---|---|
| 5,864,843 A | 1/1999 | Carino, Jr. et al. | |
| 7,680,828 B2* | 3/2010 | Gorelik | 707/763 |
| 7,779,042 B1* | 8/2010 | Bland et al. | 707/802 |
| 7,801,844 B2 | 9/2010 | Farmer | |
| 8,311,975 B1* | 11/2012 | Gonsalves | 707/606 |
| 2003/0093407 A1* | 5/2003 | Cochrane et al. | 707/2 |
| 2006/0031250 A1* | 2/2006 | Henigman et al. | 707/103 R |
| 2007/0226177 A1* | 9/2007 | Barsness et al. | 707/2 |
| 2008/0059524 A1* | 3/2008 | Biedenstein et al. | 707/104.1 |
| 2008/0148006 A1 | 6/2008 | Fuerst et al. | |
| 2009/0055439 A1* | 2/2009 | Pai et al. | 707/200 |
| 2009/0177671 A1 | 7/2009 | Pellegrini et al. | |
| 2010/0185637 A1 | 7/2010 | Morris et al. | |
| 2010/0250485 A1 | 9/2010 | Dodds et al. | |
| 2011/0125705 A1 | 5/2011 | Aski et al. | |
| 2011/0295795 A1* | 12/2011 | Venkatasubramanian et al. | 707/602 |
| 2012/0101978 A1* | 4/2012 | Wilkinson et al. | 707/602 |

OTHER PUBLICATIONS

Ralph Kimball, et al., "The Data Warehouse ETL Toolkit: Practical Techniques for Extracting, Cleaning, Conforming, and Delivering Data," John Wiley & Sons (US), (c) 2004, pp. 1-28.

* cited by examiner

*Primary Examiner* — Kris Mackes
*Assistant Examiner* — Tiffany Bui
(74) *Attorney, Agent, or Firm* — Trop, Pruner & Hu, P.C.

(57) ABSTRACT

A technique includes, in response to an access to a database involving access to a table and specifying a natural key, using the database to translate the natural key to a surrogate key based at least in part on a mapping.

13 Claims, 3 Drawing Sheets

USING A DATABASE TO TRANSLATE A NATURAL KEY TO A SURROGATE KEY

BACKGROUND

A business may employ a database called, "a data warehouse," for purposes of reporting and analyzing its business facts. The business may update the data in the data warehouse using extract, transform and load (ETL) processes. The extraction process is directed to retrieving facts for the business from various data sources, such as relational databases, non-relational databases, files, Internet sources, and so forth. Because the data sources employ different formats, the extraction process typically converts the extracted data into a uniform format for the transformation process. The transformation process applies various rules for purposes of generating the data to be loaded into the data warehouse in the load process. For example, the transformation process may include applying rules to particular columns, joining data, aggregating data, and so forth. The load process typically involves updating one or more fact tables of the data warehouse using the data generated by the transformation process.

A given table in a database may contain one or more keys, which identify corresponding sets of data of the table. For example, a given key may be a column name for a table. Keys may be natural keys or surrogate keys. A natural key typically contains language whose natural meaning describes the corresponding data. In contrast to the natural key, the nature of the data identified by a surrogate key cannot be readily identified by the surrogate key's natural meaning.

DETAILED DESCRIPTION

Figure 1:
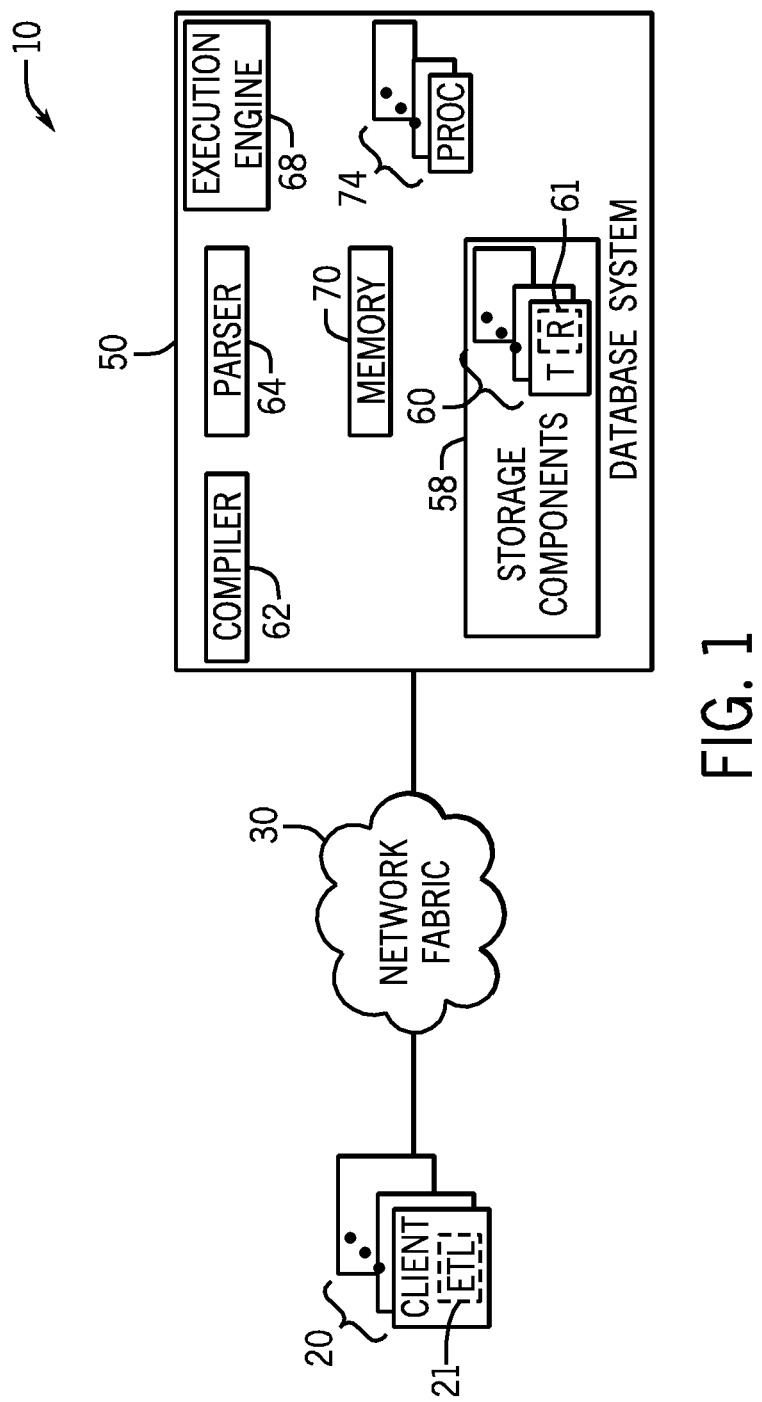
FIG. 1 is a schematic diagram of a data storage and retrieval system according to an example implementation.

Referring to FIG. 1, in accordance with an example implementation, a data storage and retrieval system 10 includes a database system (herein called a "database 50"), such as a database management system (DBMS), that stores data for one or multiple clients 20. In this manner, the client(s) 20, may access the database 50 via network fabric 30 for purposes uploading data to and retrieving data from the database 50. As non-limiting examples, the network fabric 30 may represent one or more of a variety of wired and/or wireless network connections, such a wide area network (WAN) connections, local area network (LAN) connections, Internet connections, and so forth. Moreover, as a non-limiting example, the database 50 may be a relational database.

In accordance with example implementations disclosed herein, the database 50 may be used as a data warehouse and may organize its data in various tables 60, which may be accessed by the client(s) 20. As a more specific example, the tables 60 may include fact tables, which contain facts relevant to a particular business. In this manner, a given fact table may contain data identifying historic sales information, business plans, projected sales, and so forth, for the business. The tables 60 may also contain dimension tables. In this manner, a given dimension table sets forth data describing a dimension of a fact table. For example, a given fact table may contain an employee identification dimension, and the corresponding dimension table may contain rows describing data pertaining to employee identification numbers. For this example, each row may be associated with a given employee identification number and set forth an employee name, an employee office location, an employee hire date, and so forth.

For purposes of retrieving data from the database 50, a given client 20 may submit a query request, which the database 50 processes for purposes of selecting data from the tables 60 targeted by the query request and returning the selected data to the client 20. For purposes of storing data in the database 50, a given client 20 may submit a fact table load request, which the database 50 processes, to update data stored in the tables 60. As a more specific example, one or multiple clients 20 may execute one or multiple extract, transfer and load (ETL) processes 21 for purposes of updating fact tables of the database 50.

In general, a given client request to the database 50 may specify one or multiple natural keys that identify various data attributes stored in the database 50. A natural key, in general, contains naturally descriptive language, which permits the associated data attributes to be identified from the language itself. For example, a natural key associated with data that identifies with corresponding store numbers may be "store_num." Although natural keys are efficient from the standpoint of a business entity in that the key describes the data that the key identifies, a natural key may not be efficient from the standpoint of the database system 50. In this regard, the database system 50 may internally use keys called "surrogate keys," which, in general, have no business or other descriptive meaning and as such, do not convey the attributes of the associated data. The database 50 may employ the use of surrogate keys for purposes of preserving the integrity of the dimension and fact data relationships as attributes for those dimensions change over time (i.e., attributes for which historical fact data is associated with the previous values of those attributes). That is, where the business does not want historical data to be stated in terms of the latest relevant dimension attribute values but their values as of the point in time when the fact was recorded. Therefore, as a non-limiting example, historical sales data for a store is reported against the region that the store was part of at the time of the sale, and not to the region that it currently belongs to, if a store has been reassigned to another region. Otherwise, one would be restating history.

Due to the use of the surrogate keys in the database 50 and the natural keys outside of the database 50, a natural key-to-surrogate key mapping may be employed.

Figure 2:
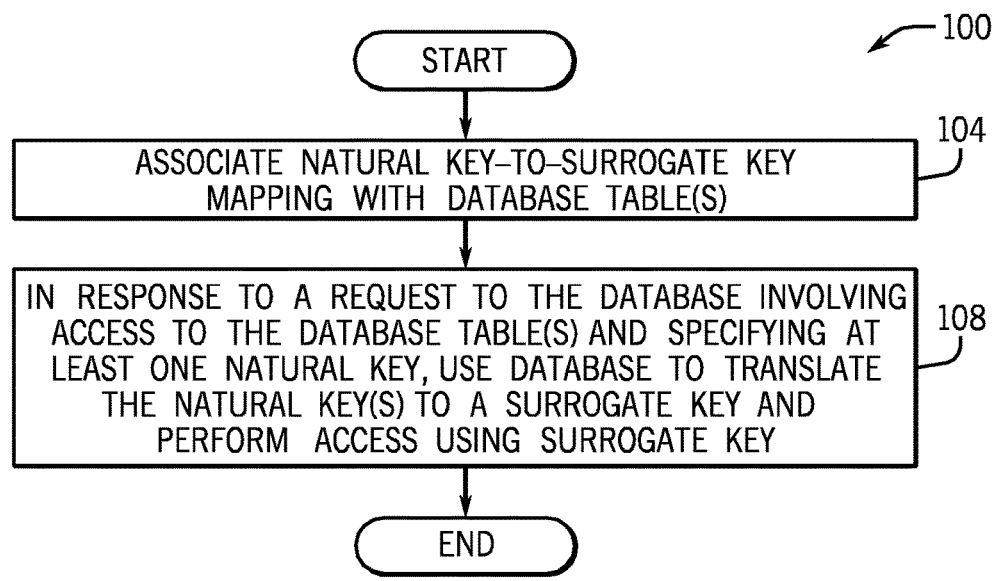
FIG. 2 is a flow diagram depicting a technique to use a database to map a natural key to a surrogate key according to an example implementation.

In accordance with systems and techniques that are disclosed herein, the database 50 is used to perform mapping of natural keys to surrogate keys so that entities that are external to the database (such as the clients 20, for example) perceive accesses to the database 50 as occurring with natural keys and as such, the surrogate keys are transparent to these entities. More specifically, in accordance with some implementations, the database 50 may employ a technique 100 that is depicted in FIG. 2. Referring to FIG. 2, in accordance with the technique 100, a natural key-to-surrogate key mapping is associated with one or multiple database tables, pursuant to block 104. In response to a request to the database 50 involving access to the database table(s) 60 and specifying at least one natural key, the technique 100 includes using (block 108) the database 50 to translate the natural key(s) to a surrogate key and perform access to the data using the surrogate key. In this context, "access" encompasses querying the database 50, as well as loading data to the database 50.

Referring back to FIG. 1, in accordance with some implementations, one or more of the tables 60 contains mapping rules 61, which, as further described herein, allow the database 50 to determine the relationships between natural keys and surrogate keys and determine the relationships between natural key parameter values and corresponding surrogate key parameter values. Using these relationships, a compiler 62 of the database 50 transforms a given database request associated with one or multiple natural keys to a corresponding database request that is associated with one or multiple surrogate key(s) to allow the database 50 to further process the transformed request using the surrogate information. In this manner, there may be multiple natural keys that are mapped to their respective surrogate keys, or there may be multiple natural keys that map to a single surrogate key. As disclosed herein, this processing may include processing load requests, processing queries, and so forth.

As depicted in FIG. 1, among its other features, the database 50 may generally include storage components 58, such as magnetic memory storage devices, solid state devices, and so forth, which store data for the various tables 60 of the database 50. The database 50 contains a parser 64, which parses incoming requests (query requests and fact table load requests, for example) into their corresponding parameters. As further described below, these parameters include natural keys and natural key values; and the compiler 62 transforms the incoming requests into requests parameterized by surrogate keys and surrogate key values. The database's execution engine 68 processes the transformed requests for purposes of accessing the tables 60.

The architecture for the database 50, which is depicted in FIG. 1 is merely an example of one of many different types of database architectures that may be employed. In general, the database system 50 is a physical machine, which contains various hardware, such as one or multiple processors 74 (one or multiple Central Processing Units (CPUs), for example), which execute machine executable instructions that are stored in a memory 70 for purposes of creating the various components of the database system 50, such as (as non-limiting examples) the compiler 62, the parser 64 and the execution engine 68. The compiler 62, parser 64 and/or execution engine 68 may be hardware components, in other implementations. In general, the memory 70 is a non-transitory memory, which may contain, as non-limiting examples, semiconductor storage components, magnetic storage components, optical storage components, and so forth.

In the following discussion it is assumed that the keys identify corresponding table columns. Therefore, the terms "key column" and "key" are used interchangeably in the following discussion. However, it is noted that in other implementations, the keys may identify data other than table columns. Thus, many variations are contemplated and are within the scope of the appended claims.

The natural-to-surrogate key mapping recognizes that one or multiple natural keys may map to a single surrogate key. In this manner, a one-to-one mapping may occur when the surrogate key is being used instead of an intelligent key or to create a more compact numeric key than the natural key.

Multiple natural keys mapping to a single surrogate key may happen in various scenarios. For example, this mapping may occur when, along with the natural key, a column or set of columns provide the information on the source of the data in order to facilitate the mapping. This information may be in the form of a division, or some indicator as to the source of the data, which qualifies the natural key, in order to map it to the surrogate key.

Multiple natural keys mapping to a single surrogate key may also occur when multiple natural keys identify the source of the data and a process provides the value of the surrogate key. For example, the natural keys may correspond to customer identification numbers from multiple sources and which map to the same master customer identification, which is the surrogate key. When it comes to mapping the natural key, along with the columns identifying the source, this scenario is very similar to the previous one. However, while inserting the row into the dimension table, a new surrogate key is not generated if its value is the same as an existing surrogate key. That is, some process provides the value of the surrogate key (the master customer identification) that maps to the customer identification from the source system. In other words, for this example, multiple customer identifications, based on the source, may map to the same surrogate key value.

As a more specific example, the database 50 may automatically perform surrogate key generation when the surrogate key column is a sequence column. For non-sequence columns, a knowledgeable user who knows, for example, that multiple different customer numbers in different divisions or source systems, map to the same customer, may supply additional information. One way to handle this is to have another master natural key for the customer that all of these other natural keys map to, in a different customer mapping table. And then this master natural key maps to a surrogate in the dimension table. In this case, mapping the natural key to the surrogate key may involve the use of a surrogate mapping expression in the dimension table that accesses the customer mapping table to retrieve the customer natural key.

Another challenge in mapping multiple natural keys to a single surrogate is that, if appropriate measures are not undertaken, there may be no trace of the original natural key for the user—just the master natural key for the user. To provide this information to the customer, the database 50 may keep the natural key and/or column values in the fact table as well, as separate attribute columns, in order to preserve the original data. These column(s) may then be used to qualify the single dimension row out of the multiple qualifying rows. This may be accomplished using the natural key to surrogate mapping expression.

A given natural key value may be present in multiple dimension table rows, being mapped to a different surrogate key value. In this case, table columns other than the natural keys are used to map the keys to a surrogate key. Usually this is a column such as expiration date or a most recent dimension row indicator, which identifies the latest dimension row to be used for mapping the natural key to the surrogate key. For example, if a store of a business was in the Eastern region of the business, and as of Jun. 15, 2010, the store moved over to the East-Central region of the business, then the latest dimension row to map the natural store key to its surrogate key would be the row for which data in some other column(s) indicate that the dimension row is effective date as Jun. 15, 2010, and is still active. In this manner, the data may indicate an expiration date of Dec. 31, 9999, or some other value (a most recent dimension row indicator, for example) that indicates that the row is still currently active.

In accordance with example implementations, mapping rules 61 (see FIG. 1), which are used by the compiler 62 to translate natural keys to surrogate keys, are associated with the dimension table and fact table and may, as a non-limiting example, be part of the declarations for the tables, as further described herein. Examples of mapping rules 61 are set forth below. It is noted that the syntax of the rules may vary from the syntax that is set forth in the example below. As other examples, non-enforceable referential integrity constraints or even ANSI domain support may be used to specify the mapping rules.

For the dimension table, a mapping rule 61 may be set forth in the declaration of the table. In this manner, a database administrator (DBA) may embed the mapping rule 61 into the declaration of the dimension table. As a non-limiting example, the dimension table may be created using a CREATE TABLE declaration, and in this declaration, the specification, "SURROGATE_KEY <surrogate-key-column-name> (natural-key-column-list, [row-identifying-expression])," identifies the natural keys that map to the surrogate key, along with an optional expression on other columns, to help identify the row to be used for that mapping, if multiple rows can have the same natural key value.

A non-limiting example is set forth below for the creation of a dimension table called "store":

```
CREATE TABLE store (
    store_surrogate SMALLINT GENERATED BY DEFAULT AS IDENTITY NOT NULL,
    store_num SMALLINT NOT NULL,
    region SMALLINT NOT NULL,
    ...
    effective_date DATE DEFAULT CURRENT_DATE NOT NULL,
    expiration_date DATE DEFAULT DATE '9999-12-31' NOT NULL,
    SURROGATE KEY store_surrogate (store_num, expiration_date = DATE '9999-12-31')
    ... );.
```

In the above example, the natural key column store_num maps to the surrogate key column store_surrogate. Given this definition, the following example store dimension table may exist:

| Store Surrogate | Store Num | Region | Effective date | Expiration date |
|---|---|---|---|---|
| 012 | 231 | East-Central | June 15th 2010 | December 31st 9999 |
| 354 | 231 | Central | February 26th 1994 | June 14th 2010 |

For the example above, there are multiple rows for the same store number 231, each with effective and expiration dates identifying when the store was in a specific region. The row with the expiration_date of "Dec. 31, 9999" is the one that identifies that the most current mapping for store 231 is the row with the surrogate number "012". From a metadata perspective, this essentially creates a new surrogate mapping object that indicates that the store_num natural key maps to store_surrogate. The expiration_date expression is also recorded in the metadata to perform the mapping, but is not considered part of the natural key since it is an expression. However, if there were other natural key or source identifier columns listed, they would be part of the natural key. This distinction of natural key columns versus the row identifier expression may be made more explicit via syntax.

As a non-limiting example, a fact table may be created using a CREATE TABLE declaration, and in this declaration, the specification, "[<natural-key-column-name> AS] SURROGATE_KEY [<fact-table-column>] [data type]=<dimension-table>.<dimension-surrogate-key-column>", instantiates a virtual natural key column and creates a fact table column that links to the dimension surrogate key column. Because column names in the fact table may be different from the column names in the dimension table and other qualifiers may be relevant to avoid ambiguous references (such as schema name), the dimension surrogate key to be used may be explicitly defined in the fact table.

A non-limiting example is set forth below for the creation of a fact table called "sales":

```
CREATE TABLE sales (
    store_num AS SURROGATE KEY
    sales_store_surrogate SMALLINT = store.store_surrogate,
    ...).
```

In the above example of a sales fact table, the sales_store_surrogate column is created that links to store.store_surrogate and has a SMALLINT data type. Also, a virtual column store_num is instantiated that represents the dimension natural key column store_num. The column sales_store_surrogate is not named and is generated and named automatically by the database 50. However, by naming it, it can be used as part of a clustering or hash key specification. This column may be explicitly referenced in a query but may not be included in a SELECT * statement.

A data type has been explicitly specified in the above example for the surrogate reference sales_store_surrogate. If the data type were not specified, the database 50 may automatically use the same data type as that of the surrogate it references (data type of store.store_surrogate) at the time of table creation. As with any such reference (e.g., a referential integrity reference), the data types between the dimension and fact tables are compatible. If the data type in the dimension is changed, even if the fact table references are compatible, the fact table data types for those surrogate columns may be changed as well, to accommodate the same range of values. The database 50 may provide the ability to cascade such changes to make it easier for the administrator.

The virtual natural key store_num may not be explicitly specified. The database 50 may automatically pick up the natural key columns from the dimension table via the store.store_surrogate reference, and make them virtual columns of the fact table.

There may be multiple references in the fact table to the same dimension table. For example, in a transaction where an item was transferred from one store to another, there may be two store numbers in the fact table mapping to the same dimension table. Unique system names are generated for these surrogates. However, these may be explicitly qualified as from_store_surrogate and to_store_surrogate, as set below in the following example:

```
CREATE TABLE transfers (
    Item_num SMALLINT NOT NULL,
    from_store_num AS SURROGATE KEY
    from_store_surrogate = store.store_surrogate,
    to_store_num AS SURROGATE KEY
    to_store_surrogate = store.store_surrogate,
    Qty LARGEINT,
    ...);
```

If there are multiple natural key columns that map to the surrogate key, then those columns would be included in this clause. For example:

```
CREATE TABLE sales (
    (customer, division) AS SURROGATE KEY
    customer.customer_surrogate, ... );
```

In this case, the natural key customer and source identifier division in the customer dimension, map to the surrogate key customer_surrogate. The number of columns specified in the mapping should correspond to the natural key columns specified in the SURROGATE KEY specification for store-.store_surrogate.

Figure 3:
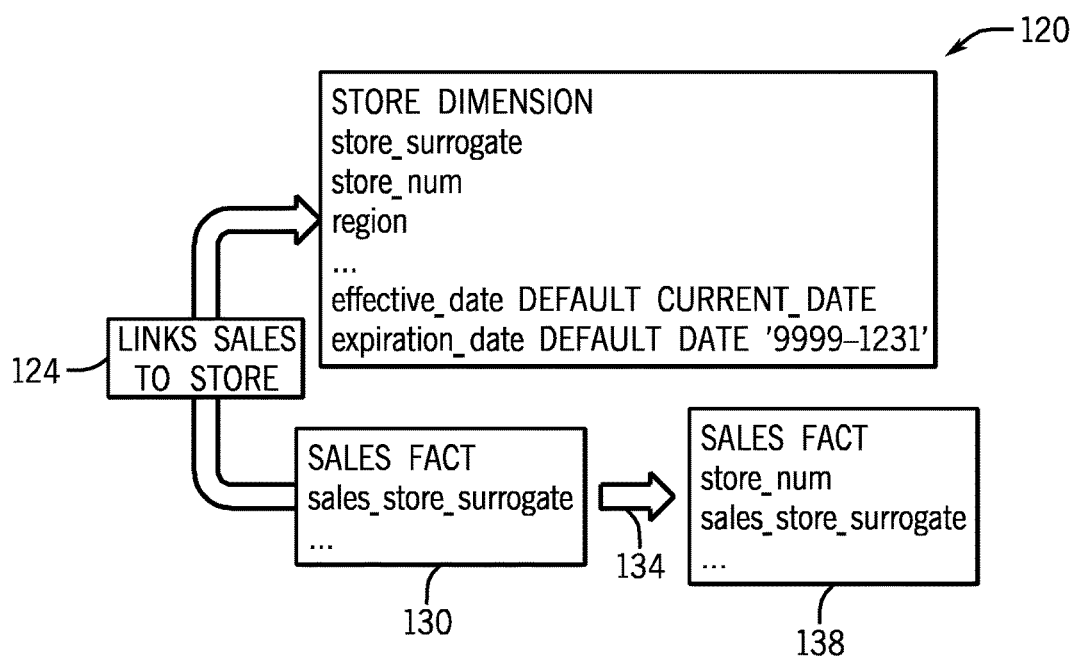
FIG. 3 is an illustration of relationships between natural and surrogate keys of example dimension and fact tables according to an example implementation.

Referring FIG. 3 in conjunction with FIG. 1, with the above-described mapping rules 61, a sales fact table 130 is linked 124 to the Store dimension table 120. Due to the mapping 134 by the database 50, a client 20 (a client 20 using ETL processes 21 or business intelligence tool-based processes, for example) outside of the database 50 sees the store_num natural key in the sales fact table 138, with the same data type and size as in the store table, even though what is being stored instead of it in the sales table is the store_surrogate mapping for that store_num, or the system generated column sales_store_surrogate (which is not exposed).

Given the above-described mapping by the database 50, a fact table load may proceed as follows. The fact table load request (generated by an ETL process 21 (see FIG. 1), for example) may be in the form (as an example) of an "INSERT TO" request, and because the request is generated externally to the database 50 and contains natural keys, the compiler 62 (see FIG. 1) of the database 50 transforms the request as follows. Using the example store dimension table and the example sales fact table that are set forth above, the compiler 62 (FIG. 1) transforms the initial request "INSERT INTO sales (store_num, . . . ) VALUES (?storenum, . . . )" into "INSERT INTO sales (sales.sales_store_surrogate, . . . ) VALUES (SELECT store.store_surrogate FROM store WHERE store.store_num=?storenum AND store.expiration_date=DATE '9999-12-31', . . . )."

The compiler 62 performs this transformation as follows. The compiler 62 knows that store_num natural key referenced in the sales table is a virtual column linked to the sales.sales_store_surrogate surrogate key via the "store_num AS SURROGATE KEY sales_store_surrogate SMALLINT=store.store_surrogate" declaration for the sales table. Therefore, the compiler 62 substitutes the store_num natural key with the sales.sales_store_surrogate surrogate key first. The same declaration also informs the compiler 62 that the sales.sales_store_surrogate surrogate key is linked to the store.store_surrogate surrogate key. From that information, the compiler 62 creates a SELECT clause to acquire the mapping of the natural key value store_num to the surrogate key value sales. sales_store_surrogate from store. store_surrogate.

Using the "SURROGATE KEY store_surrogate (store_num, expiration_date=DATE '9999-12-31')" declaration stored in the store dimension table, the compiler 62 finds out that the store.store_num natural key provides the mapping to the store.store_surrogate surrogate key, along with the expression "store.expiration_date=DATE '9999-12-31'," which identifies the row that provides the mapping. The compiler 62 constructs a WHERE predicate using the natural key and the row identifying expressions in this declaration. Using the ?storenum parameter in the original INSERT statement, the compiler 62 acquires the value for the store_num key, which is mapped for purposes of constructing the predicate.

Thus, the example above sets forth how the compiler 62 transforms an INSERT into a fact table virtual natural key column, to an INSERT into the fact table hidden surrogate key column, using the natural key to surrogate key mapping rules specified in the fact and dimension tables.

Figure 4:
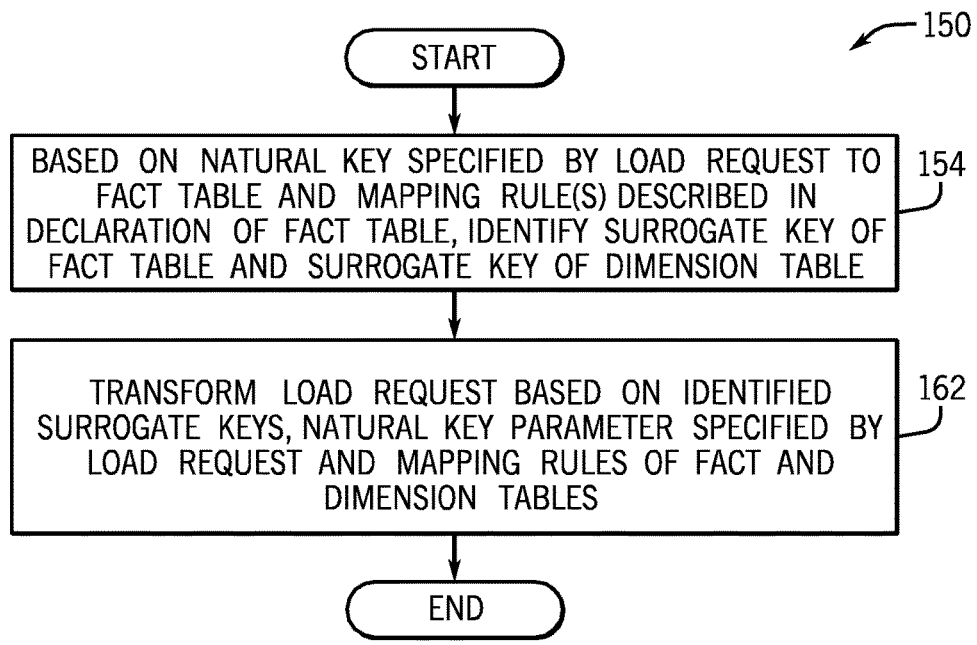
FIG. 4 is a flow diagram depicting a technique to use a database compiler to transform a load request that specifies a natural key according to an example implementation.

To summarize, FIG. 4 depicts an example technique 150 that may be used by the compiler 62 for purposes of transforming a request to load a fact table. Pursuant to the technique 150, the compiler 62 identifies (block 154) a surrogate key of the fact table and a surrogate key of a dimension table based on a natural key that is specified by the load request and mapping rule(s) that are described in the mapping rules in the declaration of the fact table. The compiler 62 then transforms the load request based at least in part on the identified surrogate keys, a natural key parameter value specified by the load request and the mapping rules of the fact and dimension tables, pursuant to block 162.

It is noted that there may be multiple such natural key-to-surrogate key mappings for each row being loaded into the fact table. Moreover, the load request may specify one or multiple other parameter values (a sales date, for the example described herein) for one or multiple other column(s), which are also used to achieve the mapping. For example, these other parameters(s) may be used to identify a qualifying row in the dimension table that maps the natural key parameter value to the appropriate surrogate key value.

The compiler 62, in accordance with example implementations, performs the following to handle fact data for previous versions of the dimension. In the example above, the store was in the Eastern region until Jun. 15, 2010, when the store was moved over to the East-Central region. This would result in two entries in the dimension table with different store surrogate keys: 1.) an entry showing store 231 in the Eastern region from the date the dimension was first created, or last changed, with the effective date range being Feb. 26, 1994, through Jun. 14, 2010, with the surrogate key value generated for this row being 354; and 2.) an entry showing store 231 in the East-Central region with an effective date range being Jun. 15, 2010 though an expiration date of Dec. 31, 9999, with the surrogate key value for this row being 012. The relevant portion of the dimension table for this example appears below:

| Store Surrogate | Store Num | Region | Effective date | Expiration date |
|---|---|---|---|---|
| 012 | 231 | East-Central | June 15th 2010 | December 31st 9999 |
| 354 | 231 | Central | February 26th 1994 | June 14th 2010 |

In the load scenario example that is set forth above, the assumption is made that all new data inserted into the sales fact table is assumed to be for the East-Central region, or the latest row in the dimension table with an expiration date of Dec. 31, 9999. However, that may not be the case. Even after Jun. 15, 2010, there may be fact sales data that may arrive for sales made before June 15th. These could be data arriving late from certain source systems or updates to existing historical data (such as corrections or adjustments).

To handle this scenario, in accordance with example implementations, the mapping expression in the SURROGATE KEY declaration specifies a parameter, ?dim_sales_date, and the value for this parameter is supplied at run time when the natural key is mapped to the surrogate. Therefore, the CREATE TABLE declaration for the store table may be modified as follows:

```
CREATE TABLE store (
    store_surrogate SMALLINT GENERATED BY DEFAULT AS IDENTITY NOT NULL,
    store_num SMALLINT NOT NULL,
    ...
    effective_date DATE DEFAULT CURRENT_DATE NOT NULL,
    expiration_date DATE DEFAULT DATE '9999-12-31' NOT NULL,
    ...
    SURROGATE KEY store_surrogate (store_num,
        ?dim_sales_date BETWEEN effective_date and expiration_date)
    ... );
```

In the example above, the ?dim_sales_date is greater than or equal to an effective date and less than an expiration date. In this case, the row locator expression to identify which row in the store dimension should be used to map the natural key to the surrogate key does not merely involve an equality predicate on a literal. Instead, the row locator expression is more complex (using the BETWEEN expression) involving a parameter value ?dim_sales_date, for which the value will be provided at run time when the natural key-to-surrogate key mapping is performed.

Continuing the example, the sales fact table is created as follows:

```
CREATE TABLE sales (
    store_num AS SURROGATE KEY store.store_surrogate
        SMALLINT = (?dim_sales_date = sales.sales_date),
    sales_date DATE,
    ... );
```

Thus, the surrogate key specification for the sales table specifies that the value for the parameter ?dim_sales_date, which is used in the row identifying expression in the dimension table, is to be acquired from sales_date column.

Due to the above-described specification, the fact table load request, "INSERT INTO sales (store_num, sales_date, . . . ) VALUES (?storenum, ?salesdate, . . . )," is translated into the fact table load request, "INSERT INTO sales (sales.sales_store_surrogate, . . . ) VALUES (SELECT store.store_surrogate FROM store WHERE store.store_num=?storenum AND ?salesdate BETWEEN store.effective_date AND store.expiration_date, ?salesdate, . . . )." In this translation, the compiler 62 maps the value supplied for sales_date, or ?salesdate, to the parameter ?dim_sales_date expected in the surrogate key mapping expression on the dimension table. This way, the correct row is identified in order to map the natural key to the surrogate key, depending on whether the sales data coming in is prior to or after Jun. 15, 2010. More specifically, the compiler 62 transforms the INSERT statement as follows. First, the compiler 62 creates a WHERE predicate to locate the appropriate row in the dimension table to map the natural key value to the surrogate key value, which is returned via a SELECT, to be inserted into the surrogate key column in the fact table. Therefore, the expression "?dim_sales_date BETWEEN store.effective_date and store.expiration_date" ends up in the WHERE clause as the row identifying expression. The parameter ?dim_sales_date is not referenced in the query, since that is a declaration made at the store table creation time and is not known to client 20. The surrogate key declaration on the sales fact table, (?dim_sales_date=sales.sales_date) provides a reference indicating that this parameter is associated with sales.sales_date. That is, the BETWEEN predicate is applied to the value in sales.sales_date in order to identify the row that will provide the mapping. The sales.sales_date value may be located in the INSERT clause, where it is indicated that the value for sales.sales_date may be acquired from the parameter ?salesdate. The compiler 62 therefore replaces the ?dim_sales_date reference with the ?salesdate value.

It is noted that the search for the qualifying row may not involve scanning all of the rows of the store dimension table. If there is an index on the store_num natural key, then the compiler 62 scans the corresponding qualified rows. It is further noted that the number of parameter values that are used to identify a dimension row may be more than one. In that case, the fact table would need to pass multiple parameter values to identify the correct row.

The compiler 62 handles query requests as follows. Using the above-described sales and facts tables as examples, when querying the sales table, the end user specifies a predicate such as sales.store_num=231. The compiler 62 transform this query by introducing a join to the store dimension where the hidden system generated surrogate column sales.sales_store_surrogate=store.store_surrogate AND store.store_num=231.

More specifically, as an example, the compiler 62 may transform the following example query request
   SELECT sales_date, sales_qty, sales_amt
   FROM sales
   WHERE store_num=231
into the query request:
   SELECT sales_date, sales_qty, sales_amt
   FROM sales, store
   WHERE store.store_num=231
   AND sales. sales_store_surrogate=store. store_surrogate
As another example, if the user wants to join the sales table to the store table on their natural keys to, for example, pull the region of the store, the user may submit the following query:
   SELECT store.region, sales_date, sales_qty, sales_amt
   FROM sales, store
   WHERE sales.store_num=store.store_num.
For the transformation of the query, the SELECT and FROM clauses do not change, but the compiler 62 replaces the predicate sales.store_num=store.store_num with sales.sales_store_surrogate=store.store_surrogate, based upon the relationships established by the SURROGATE KEY declarations specified on the dimension and fact tables:
   WHERE sales.sales_store_surrogate=store.store_surrogate.
This provides transparency for selects. The end user is not aware that the fact table actually has surrogate values stored in it for the dimension, and not the natural key value. And, there was no join view used to facilitate this transparency.

In the case where multiple natural keys are being mapped in the dimension table to the same surrogate key, there can be multiple rows in the dimension table for a surrogate key value in the fact table referencing that dimension surrogate key. When writing queries joining the fact and dimension tables in such cases, the user provides the appropriate predicates in order to select only a single row from the dimension table.

Figure 5:
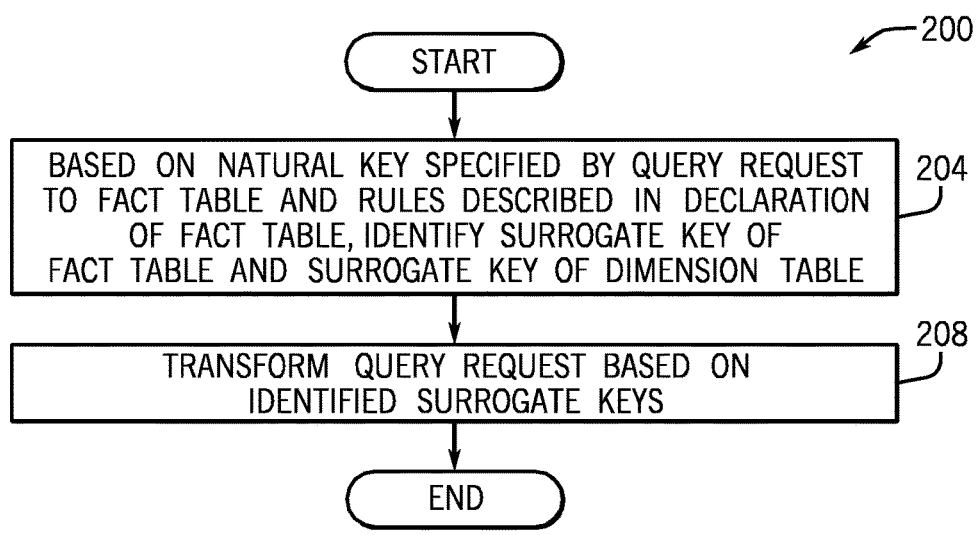
FIG. 5 is a flow diagram depicting a technique to use a database compiler to transform a query request that specifies a natural key according to an example implementation.

To summarize, the compiler 62 may transform query requests pursuant to a technique 200 that is depicted in FIG. 5. Pursuant to the technique 200, the compiler 62 identifies a surrogate key of the fact table and a surrogate key of the dimension table based on the natural key that is specified by a query request to a fact table and rule(s) that are specified in the declaration of the fact table, pursuant to block 204. The compiler 62 transforms the query request based on the identified surrogate keys, pursuant to block 208.

Other implementations are contemplated and are within the scope of the appended claims. For example, in other implementations, a separate table may be employed to map multiple natural keys to surrogate keys. As another example, the database may be a non-relational database.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
associating a natural key-to-surrogate key mapping with a table of a database by at least one physical processor; and
in response to an access to the database involving access to the table and specifying a natural key, using the database to translate the natural key to a surrogate key based at least in part on the mapping, by the at least one physical processor,
wherein the access comprises a request specifying the natural key and being submitted to the database and using the database to translate the natural key to the surrogate key comprises using a compiler of the database to transform the request to replace the natural key with the surrogate key based at least in part on the mapping,
wherein the table comprises a fact table, the request comprises a request for a query to the fact table, and wherein using the database to translate the natural key to the surrogate key comprises:
using the compiler of the database to transform the query to join the fact table with a dimension table to evaluate at least one predicate against a natural key column that resides in the dimension table, based at least in part on a first mapping rule associated with the fact table and a second mapping rule associated with the dimension table.

2. The method of claim 1, wherein the mapping comprises a natural key-to-surrogate key mapping indicated by a declaration of the dimension table.

3. The method of claim 2, wherein the natural key-to-surrogate key mapping indicated by the declaration of the dimension table comprises a mapping identifying a natural key column of the dimension table and identifying a row of the dimension table.

4. The method of claim 1, further comprising:
performing a load to the fact table that specifies another natural key value by
using the compiler of the database to identify a first surrogate key of the fact table and a second surrogate key of the dimension table based at least in part on a third mapping rule associated with the fact table and the other natural key; and
using the compiler to transform the load request based at least in part on the other natural key value, the third mapping rule associated with the fact table and a fourth mapping rule associated with the dimension table.

5. A system comprising:
a database compiler comprising a processor and a memory that includes instructions that when executed, cause the compiler to:
in response to an access to a database including a fact table, use a natural key-to-surrogate key mapping associated with the table to translate a natural key to a surrogate key,
wherein the natural key is associated with a natural key column, the fact table is associated with a dimension table, the access comprises a load request to the fact table and specifies a natural key value, and the database compiler is further adapted to:
identify a first surrogate key of the fact table and a second surrogate key of the dimension table based at least in part on a first mapping rule associated with the fact table and the natural key; and
transform the load request based at least in part on the natural key value, the first mapping rule associated with the fact table and a second mapping rule associated with the dimension table.

6. The system of claim 5, wherein the database compiler is further adapted to translate the natural key to the surrogate key based at least in part on a natural key-to-surrogate key mapping indicated by a declaration of the dimension table.

7. The system of claim 6, wherein the natural key-to-surrogate key mapping indicated by the declaration of the dimension table comprises a mapping identifying a natural key column of the dimension table and identifying a row of the dimension table.

8. The system of claim 5, wherein the database compiler receives a query to the fact table including a second natural key, and the database compiler is further adapted to:
transform the query to join the fact table with the dimension table to evaluate at least one predicate against a natural key column that resides in the dimension table, based at least in part on a third mapping rule associated with the fact table and a fourth mapping rule associated with the dimension table.

9. The system of claim 5, wherein the natural key is one of a plurality of natural keys associated with a plurality of dimensions, and the database compiler is further adapted to map a plurality of natural key values to a plurality of respective surrogate key values.

10. An article comprising a non-transitory computer readable storage medium storing instructions that when executed by a processor-based system cause the processor-based system to:
associate a natural key-to-surrogate key mapping with a table of a database;
in response to an access to the database involving access to the table and specifying a natural key, in a compiler of the database, translate the natural key to a surrogate key based at least in part on the mapping,
wherein the table comprises a fact table, the access comprises a query to the fact table, and
transform the query to join the fact table with a dimension table to evaluate at least one predicate against a natural key column that resides in the dimension table, based at least in part on a first mapping rule associated with the fact table and a second mapping rule associated with the dimension table.

11. The article of claim 10, wherein the database comprises a dimension table and the mapping comprises a natural key-to-surrogate key mapping indicated by a declaration of the dimension table.

12. The article of claim 10, wherein the natural key-to-surrogate key mapping indicated by the declaration of the dimension table comprises a mapping identifying a natural key column of the dimension table and identifying a row of the dimension table.

13. The article of claim 10, wherein the storage medium stores instructions that when executed by the processor-based system cause the processor-based system to:
receive a load request to the fact table including a second natural key that is associated with a natural key column;
identify a first surrogate key of the fact table and a second surrogate key of the dimension table based at least in part on a third mapping rule associated with the fact table and the second natural key; and
transform the load request based at least in part on the second natural key value, the mapping rule associated with the fact table and a fourth mapping rule associated with the dimension table.

\* \* \* \* \*